June 17, 1952 L. G. SAYWELL 2,600,434
SEALING DEVICE
Filed June 6, 1950 3 Sheets-Sheet 1
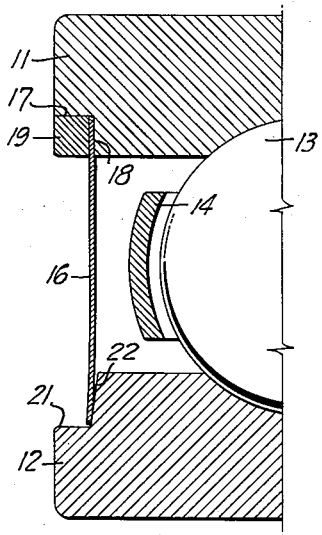
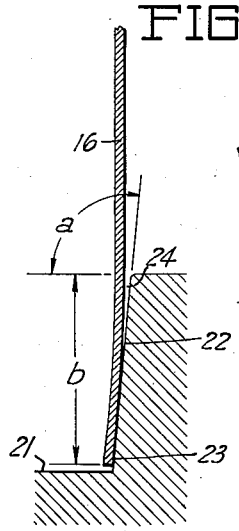
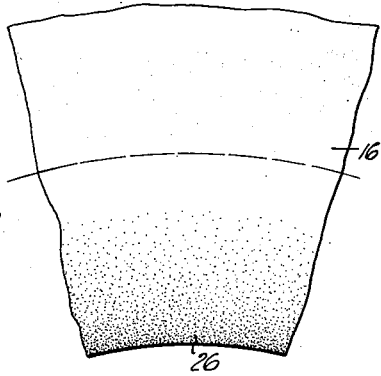
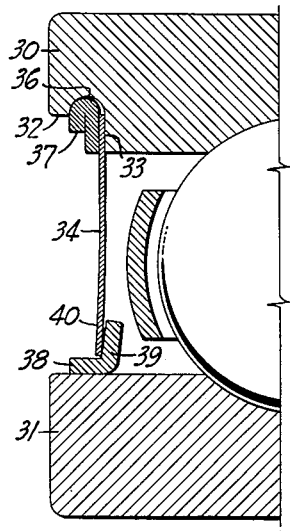
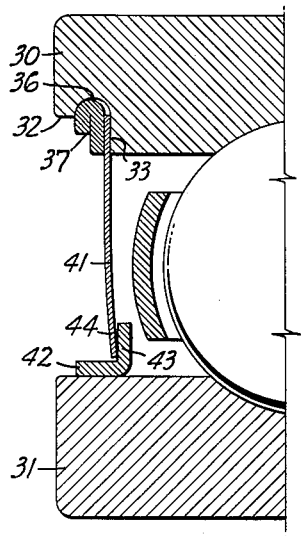
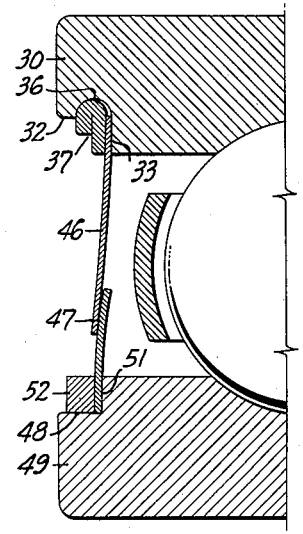
INVENTOR.
Lawrence G. Saywell
BY
ATTORNEYS June 17, 1952   L. G. SAYWELL   2,600,434
SEALING DEVICE
Filed June 6, 1950   3 Sheets-Sheet 2
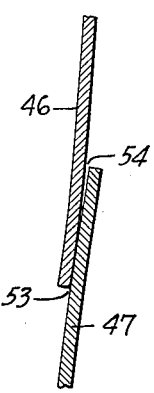
FIG_7_
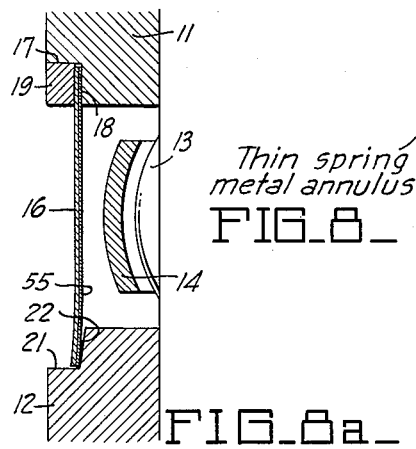
Thin spring metal annulus
FIG_8_
FIG_8a_
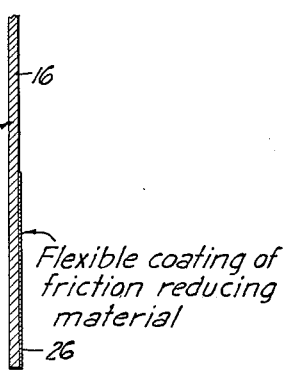
Flexible coating of friction reducing material
FIG_9_   FIG_10_   FIG_11_
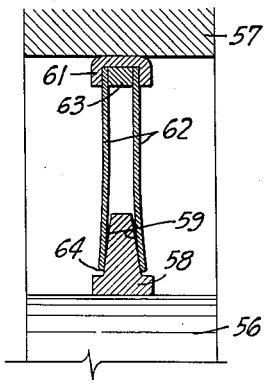 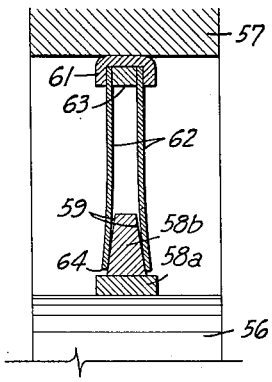 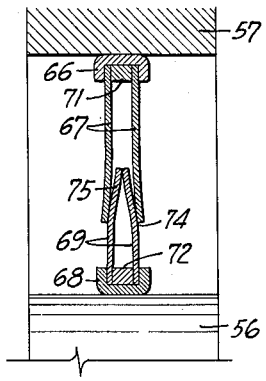
FIG_12_
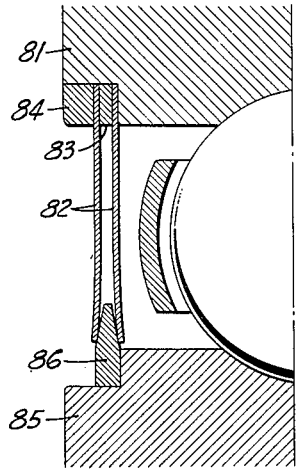
FIG_13_
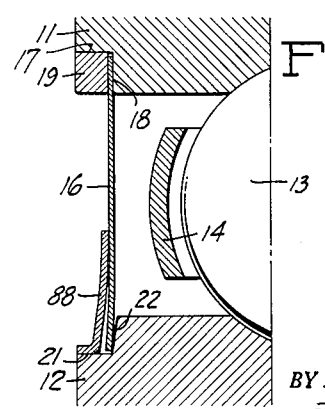
INVENTOR.
Lawrence G. Saywell
BY
ATTORNEYS June 17, 1952  L. G. SAYWELL  2,600,434
SEALING DEVICE
Filed June 6, 1950  3 Sheets-Sheet 3
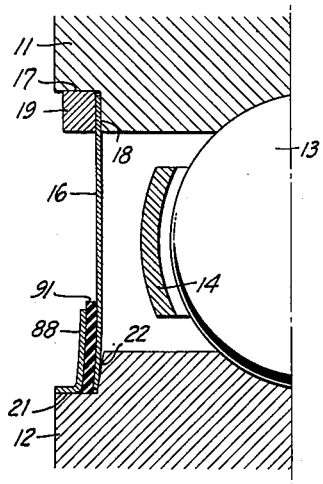
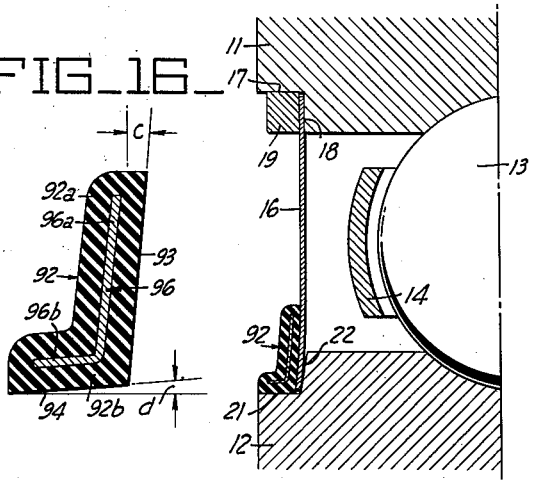
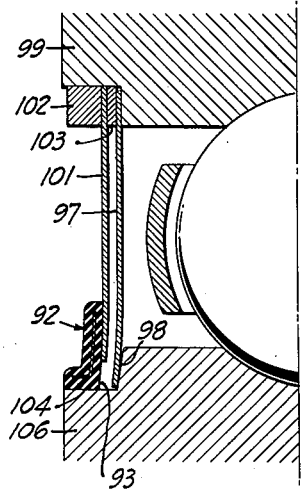
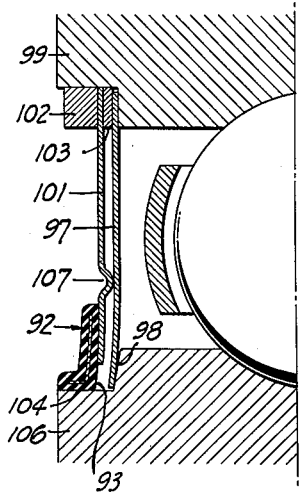
INVENTOR.
Lawrence G. Saywell
BY
ATTORNEYS Patented June 17, 1952

2,600,434

UNITED STATES PATENT OFFICE 2,600,434

SEALING DEVICE

Lawrence G. Saywell, San Mateo, Calif., assignor to Saywell Associates, South San Francisco, Calif., a joint venture Application June 6, 1950, Serial No. 166,344

6 Claims. (Cl. 286—11)

This invention relates generally to the construction of lubricant sealing devices and particularly sealing devices suitable for incorporation in bearing assemblies of the ball or roller type.

The more conventional types of lubricant seals make use of a sealing flange or like member formed of leather or rubber, which is pressed into sealing contact with the inner shaft or other rotatable part. Such seals are known to have inherent disadvantages, including particularly inability to maintain a good lubricant seal over a long period of time, and deterioration under severe service conditions, such as relatively high temperatures or high speeds of rotation. When used in conjunction with ball or roller bearing assemblies, the useful life of such seals is unpredictable, and is generally considered to be considerably less than the life of the bearing assembly. This complicates the problem of providing a commercially satisfactory sealing assembly which is packed with lubricant at the factory, and is intended for use over long periods of time without servicing. Thus for such industrial applications a ball bearing assembly equipped with a conventional type of lubricant seal may have a greatly reduced useful life because of seal failure occurring long before the useful life of the bearing assembly has been utilized.

In my Patent 2,428,041 I have disclosed a lubricant seal which can be made entirely of metal parts, and which is capable of providing relatively long useful life compared to seals of conventional construction. Such an all metal seal can better withstand relatively severe services such as exposure to relatively high temperatures. The seal disclosed in said Patent 2,428,041 makes use of a plurality of annuluses formed of relatively thin spring metal. Thus the embodiment illustrated in Figure 9 of said patent employs two spring metal annuluses for the inner rotor structure, and two spring metal annuluses for the outer stator structure. The free margins of the annuluses are in overlapping relation, and the annuluses are stressed laterally within their elastic limits whereby the overlapping portions are urged into sealing engagement.

While sealing devices made according to my above mentioned patent are highly effective and can be used in conjunction with ball or roller bearing assemblies, they are relatively expensive compared to the preferred embodiments of the invention herein disclosed, and the cost of production may be too great for commercial application to bearing assemblies designed for large scale low cost manufacture and sale.

It is an object of the present invention to provide a relatively simple form of sealing device which can be manufactured in large quantities at relatively low cost and which is well suited for application to ball or roller bearing assemblies.

Another object of the invention is to provide a sealing device of the above character which is well adapted for use with bearing assemblies where it is desired to pack the assembly with grease or like lubricant at the factory.

Another object of the invention is to provide a sealing device of the above character, which when installed in a ball or roller bearing assembly will serve to seal against entrance of foreign material such as abrasive dust.

Additional objects of the invention will appear from the following description in which the preferred embodiment has been set forth in detail in conjunction with the accompanying drawing.

Referring to the drawing:

Figure 1 is a fragmentary sectional view illustrating a ball bearing assembly incorporating the present invention.

Figure 2 is an enlarged cross-sectional detail illustrating the manner in which one of the spring metal annuluses cooperates with a shoulder face formed on the inner ball bearing race.

Figure 3 is a detail illustrating the wear pattern formed on the inner face of the annulus, for the assembly of Figure 1.

Figure 4 is a cross-sectional view like Figure 1, but illustrating another embodiment of the invention.

Figure 5 is a cross-sectional view like Figure 1, but illustrating another embodiment of the invention.

Figure 6 is a cross-sectional view like Figure 1, but illustrating another embodiment of the invention.

Figure 7 is an enlarged cross-sectional detail illustrating the manner in which the outer and inner annuluses of Figure 6 make sealing contact with each other.

Figure 8 is a cross-sectional detail showing a coated spring metal annulus for use with the assemblies of Figures 1 to 7 inclusive.

Figure 8a is a cross-sectional view like Figure 1 but illustrating another embodiment of the invention.

Figure 9 is a cross-sectional view illustrating another embodiment of the invention, intended for application to shafts, apart from a ball or roller bearing assembly.

Figure 10 is a cross-sectional detail like Figure 9, but illustrating another embodiment of the invention.

Figure 11 is a cross-sectional detail like Figure 9, but illustrating another embodiment of the invention.

Figure 12 is a cross-sectional detail like Figure 1, but illustrating another embodiment of the invention.

Figure 13 is a cross-sectional detail like Figure 1 but illustrating another embodiment of the invention.

Figures 14 through 18, inclusive, illustrate further modifications of the present invention including additional resilient means.

In Figures 1 and 2 I have illustrated one form of my invention incorporated in a ball bearing assembly. The ball bearing assembly consists of the outer and inner ball bearing races 11 and 12, which may be variously dimensioned to suit different industrial applications. The balls 13, which are interposed between the races, are held in proper spaced relation by the separator 14. At one end of this assembly there is an annulus 16 formed of relatively thin spring metal. For the more common sizes of ball bearing assemblies the annulus may be from 0.003 to 0.006 inch in thickness and it may be formed of suitable material such as high carbon spring steel, Phosphor bronze, or any one of the so-called stainless steels.

The outer margin of the annulus 16 is sealed with respect to the race 11, and preferably fixed thereto. Thus one end of the race 11 is machined to provide the annular recess 17 and the annular shoulder face 18. The outer margin of the annulus 16 is held against the face 18 by the pressed in retaining ring 19.

The inner race 12 is provided with means forming an annular surface for cooperating with the inner margin of the annulus 16. Thus a corresponding end of the inner race 12 is machined to provide the annular recess 21, and to likewise form the shoulder face or annular surface 22. In the embodiment illustrated it is desirable to form the surface 22 at a slight bevel, or in other words so that it conforms substantially to the surface of a shallow cone. Thus as indicated in Figure 2, the angle $a$ can be of the order of from 93 to 100°, whereby the angle formed between the annular face 22 and a plane perpendicular to the axis of the assembly may be from 3 to 10°. The annular surface 22 may or may not extend exactly in a radial direction, that is normal to the axis of the rotary members but in any event can be said to comprise an axially facing annular surface since that surface does "face" in a generally axial direction.

The inner margin of the annulus 16 extends over substantially the entire area of the surface 22, and is pressed against this surface to establish a continuous sealing contact. The contact pressure is developed by the fact that when installed, the outer and inner margins of the annulus 16 are displaced relative to each other a substantial amount in an axial direction, thus applying a lateral stressing to the annulus. This stressing is within the elastic limit of the spring material, whereby it is retained throughout the life of the seal.

It will be noted from Figure 2 that the inner margin of the annulus 16 which is in overlapping relation with the radially extending surface 22 (distance $b$ in Figure 2) is slightly cupped because of the lateral stressing, and because this margin is being pressed against the surface 22. This can be better understood by pointing out that when the annulus 16 is first positioned within the recess 17 and is advanced against the shoulder 18, the inner peripheral edge of the annulus first contacts the surface 22, and thereafter the annulus is stressed laterally to bring its outer margin into firm contact with the shoulder face 18. Deflection and stressing in this manner serves to impart a slight curvature to the inner margin of the annulus 16, as viewed in cross-section in Figure 2. The region of maximum pressure between the annulus and the surface 22 is at the inner peripheral edge of the annulus 16, and is designated at 23. However the area of sealing contact between the annulus and surface 22 extends outwardly for a substantial radial distance from the region 23 which is many times greater than the thickness of the annuluses, although as will be presently explained in greater detail the radial extent of this contact area is substantially less than the complete radial distance $b$.

In the assembled relationship described the annulus 16 is axially deflected by the annular surface 22 and resiliently presses thereagainst in an effort to assume a position wherein the inner face of the annulus would extend in a direction radially converging toward the annular surface. That is, the annulus tends to assume a truly radial direction which would converge toward the surface 22 in a direction away from the outer race 11 upon which the annulus is supported.

Because of the relationship of the parts described above, there is what can be termed a graduated loading between the annulus and the surface 22. Such graduated loading is better illustrated in Figure 3. In this view I have shown the inner face of the annulus which overlaps the surface 22, and the normal contact area has been shaded by stipling. The shading is darkest for the inner periphery of the annulus, thus representing the greatest loading forces. As one progresses outwardly from the inner periphery of the annulus, the shading is progressively lighter, thus representing progressively lighter contact forces between the annulus and surface 22.

The wear pattern obtained in usage will conform substantially to the graduated loading represented in Figure 3. In other words wear will tend to be greatest for the regions of the annulus near its inner periphery, and outwardly from this region the wear will be progressively less for the areas where the pressure between the surfaces is less.

It is well known that in conventional ball bearing assemblies there is limited permissible axial play between the outer and inner races. This play for a given type of assembly will be within certain tolerance limits, which are maintained during manufacture and assembly. In addition to the graduated loading effect described above, in my assembly substantially the same graduated loading is maintained for all relative positions of the outer and inner races which they may assume within such tolerance limits.

The above may be better explained by pointing out that if the loading pressure between the inner margin of the annulus 16 and the face 22 were evenly distributed over the entire area of surface 22 for medial positioning of the races, then axial movement of the inner race relative to the outer, from such medial position, would cause the region of maximum contact pressure to shift to either the outer periphery of the surface 22, or the inner periphery of the surface 22, depending upon the positioning of the races. This would be undesirable because it would result in an uneven wear pattern and would interfere with maintenance of an optimum seal.

With my construction, the angle of the surface 22, in conjunction with the stressing and deflection of the annulus 16, is such that the region of maximum contact pressure remains at the inner periphery of the annulus 16 (at point 23) and does not shift to the outer periphery of surface 22. In order to insure maintenance of this relationship, normally there is a slight clearance between the outer portion of surface 22 and the adjacent surface of the annulus, as indicated at 24 in Figure 2. This clearance is of such value that when the inner race is moved axially relative to the outer race, to any one extreme position permitted by the tolerances to which the assembly has been manufactured, the clearance at 24 is slightly greater than the total permissible axial movement between the races. Thus when the inner race is moved in an opposite direction relative to the outer race, to the limit permitted by the tolerances, clearance 24 will be reduced, but the adjacent surfaces will not be pressed into contact to shift the region of maximum contact pressure.

In commercial ball or roller bearing assemblies, the races will either be provided with a fixed closure for one end of the same, or with a sealing arrangement like that described above. At the time of assembly the space between the races is packed with a suitable lubricant, such as a viscous grease. With the maintenance of a small clearance at 24, it is evident that grease will find its way into the same, and because this clearance gradually merges into the area of contact (i. e. the shaded portion in Figure 3) capillary action tends to maintain a thin film of lubricant between the contacting surfaces, thus reducing friction and wear, and aids in maintaining the desired seal.

The arrangement described above affords both a knife edge-like exterior seal at the inner peripheral edge of the annulus where the loading force is greatest as well as an interface seal over the extended area of interface contact.

In assembly it is desirable that annulus 16 be centered by its relationship with the inner rather than the outer race. Thus the radial clearance between the outer edge of annulus 16 and the periphery of recess 17 is preferably greater than the radial clearance between the inner edge of the annulus and the inner race, and the latter clearance is relatively close. In addition to facilitating assembly, this relationship is desirable because it tends to minimize entrance of dust or other foreign material from the exterior of the assembly to the sealing surfaces.

While it is possible to have direct metal to metal contact between the annulus and the surface 22, I prefer to provide the inner race of the annulus with a thin flexible composite coating 26 which will reduce friction and wear. A good coating material is one consisting of a number of divided solid ingredients, including graphite and one or more divided metals in flake form, which are bonded together in a homogeneous mass by a thermally set synthetic resin.

The following is an example of a formula which can be used with good results as an antifriction coating material:

5 grams phenolformaldehyde resin in the form of a powder
0.4 gram amorphous graphite
1.7 grams lead in flake form having a particle size of about 320 mesh
1.7 grams copper in flaked form having a particle size of about 320 mesh The ingredients are homogeneously mixed together and the resin content dissolved with a suitable solvent such as a mixture of ethyl, isopropyl and butyl alcohols. Thus a fluid mixture is provided which can be sprayed, brushed on, or applied by dipping. The surface to be coated is first suitably cleaned, as by sanding or sandblasting and then the above fluid composition is applied. After applying one or more coats, followed by air drying, the coating is cured by heating the same in a suitable oven to a temperature of the order of 300° F. or higher, to thermally set the resin. The thickness of such a coating may be of the order of 0.001 to 0.002 inch.

In Figures 3 and 8 the coating is indicated at 26, and is applied to only the inner face of the annulus 16. If desired the coating can be confined to an annular area of the annulus which is maintained in juxtaposition to the annular surface 22. Also a similar coating can be applied to the outer side of the annulus to protect against corrosion.

A coating such as described above is particularly desirable in the present instance because it provides a thin layer which is relatively softer than the metal of the annulus, and the metal forming the surface 22. In this relatively softer coating sharp abrasive particles of dust may embed themselves, and thus render them ineffectual to cause scoring of the sealing surfaces. In addition application of such a coating in the manner described makes the sealing device less dependent upon the presence of lubricant between the surface 22 and the inner margin of the annulus.

Operation of the sealing device described above can be summarized as follows: In a normal installation of the bearing assembly, the outer race 11 is fitted to the bore of a housing, and the inner race 12 is fitted on a shaft. The inner race rotates, and may move axially a small amount within the limits of the tolerances provided in manufacture. The lubricant with which the assembly is packed tends to form a thin film over the contact area, or in other words over the shaded area illustrated in Figure 3. The graduated loading previously described forms a highly effective seal against leakage of lubricant and at the same time forms a sharply defined and effective seal at the localized region 23, to prevent entrance of foreign material, such as abrasive particles of dust or external fluid. In other words the relatively thin spring metal sealing member 16 presents radially a line shearing action with respect to external foreign material or fluid, and also a graduated internal sealing over the substantial and radially extended area of interface contact. Rotation of the inner race, particularly at the higher speeds, tends to cause considerable turbulence in the body of lubricant which finds its way into the clearance space 24, and this turbulence, together with a tendency for the body of grease in the clearance 24 to rotate together with the inner race, tends to cause a type of pumping action which is directed in a general outward direction, and which aids in preventing loss of lubricant by leakage. Irrespective of movement of the inner race relative to the outer, within the tolerances provided in manufacture, the loading and wear pattern remains substantially the same, with the greatest loading pressure being applied at the inner peripheral edge of the annulus. In spite of such loading being greatest at the inner peripheral edge of the annulus, the sealing area is of substantial radial extent, thus avoiding a knife edge action with respect to surface 22, and making for a minimum amount of friction and long useful life.

By way of example, rather than limitation, in one particular instance proportions were employed as follows: The outer race had external and internal diameters of 2.440 and 2.050 inches respectively. The inner race had external and internal diameters of 1.570 and 1.181 inches respectively. The recess 17 was machined on a diameter of 2.172 inches, thus providing a planar shoulder face measuring 0.061 inch in radial width. The recess 21 was machined on a diameter of 1.454 inches, thus providing an annular surface 22 measuring about 0.058 inch in radial width. This surface was formed on an angle of about 5° to a plane at right angles to the axis of the assembly. For the medial position of the inner race, between the tolerance limits, the base of surface 22 was in a plane displaced axially from the plane of face 18, by 0.012 inch. The spring metal annulus employed was made of blue spring steel, and had outer and inner diameters of 2.160 and 1.580 inches respectively. It was formed of high carbon blue spring steel having a thickness of 0.005 inch. The inner face of the annulus was coated with an antifriction material like that previously described, and the coating was about 0.001 inch in thickness. After a short-run-in period the wear pattern on the inner margin of the annulus was substantially as illustrated in Figure 3, and the radial width of the contact area was about 0.035 inch. Within the range of tolerance between the outer and inner races (0.006-0.007 inch) for the particular ball bearing assembly, the wear pattern remained substantially as illustrated in Figure 3, without developing wear adjacent the outer edge of the surface 22. This assembly operated well at speeds ranging as high as 5,000 R. P. M. when packed with viscous lubricating grease. Over long periods of test no lubricant leakage was detected.

Figure 4 illustrates another embodiment of the invention in which different means is utilized for retaining the annulus in place on the outer race 30, and in which a special member is employed on the inner race 31 for forming an annular sealing surface for contact with the annulus. Thus in this instance the outer race 30 is provided with a machined recess 32, and a shoulder face 33 which is engaged by the outer margin of the spring metal annulus 34. The outer race is also machined to provide the groove 36, which serves to receive the locking ring 37. The locking ring can be made of pressed metal folded upon itself as illustrated, and forced into the groove 36 by a radial swaging operation. A metal ring 38, which is L-shaped in section, is pressed upon the outer periphery of the inner race 31. The flange 39 of this ring provides a surface 40 corresponding to the surface 22 of Figure 1, and which cooperates to form sealing contact with the annulus 34. The positioning of the ring 38 relative to the plane of the face 33 is such that annulus 34 is deflected and stressed laterally, thus developing proper pressure between the inner margin of the annulus and the surface 40, with the desired graduated loading pressure.

Operation of the embodiment shown in Figure 4 is substantially the same as Figures 1 to 3 inclusive. However in this instance the flange 39 also functions as a flinger to throw oil outwardly from its outer peripheral edge, when the inner race is being rotated.

In the foregoing embodiments the annulus is normally planar, but is deflected and stressed laterally when installed in the bearing assembly. In the embodiment illustrated in Figure 5, the annulus 41 is made in dished form and is deflected and stressed toward planar form when installed. Thus in this instance the spring metal annulus 41 has its outer margin attached to the race 30 as in Figure 4, and the inner race 31 is provided with a pressed on ring 42 formed of suitable material such as sheet metal. The flange 43 of ring 42 is in a plane at right angles to the axis of the assembly, thus providing a flat or planar surface 44 for engaging the inner margin of the annulus 41. The amount of preset or dish imparted to the annlus 41 is such that when deflected and stressed laterally the maximum loading pressure will be applied at the inner periphery of the annulus, and the area of contact will be substantially as explained above in connection with Figures 1 to 3 inclusive.

In place of utilizing an annulus surface formed upon a rigid part, for engagement by the spring metal annulus, it is possible to utilize another annulus made of spring metal material. Thus as shown in Figure 6, in place of a single spring metal annulus, I employ two spring metal annuluses 46 and 47. The inner annulus 47 is positioned within the recess 48, formed in the inner ball bearing race 49, and is held against the cooperating shoulder 51 by the pressed-on ring 52. The two annuluses have overlapping margins, and when installed in the races they are deflected and stressed laterally within their elastic limits. The arrangement is such that the area of contact between the overlapping margins provides a contact pattern substantially as illustrated in Figure 3. In other words maximum contact pressure is at the region 53, corresponding to the inner peripheral edge of the annulus 46. In the region 54 there is normally a slight clearance. This relationship between the overlapping margins can be obtained by properly selecting the strength or thicknesses of the annuluses, as for example by utilizing material for annulus 46 which is somewhat stiffer or thicker than the annulus 47. This causes a somewhat greater proportional deflection of the annulus 47, so that its one face corresponds in effect to the beveled annular surface 22 of Figure 2.

As shown in Figure 8a, in place of or in addition to the coating 26, I can provide a facing annulus 55 of suitable non-metallic material such as a thin sheet of fiber reinforced phenolic condensate product having smooth polished surfaces. This facing annulus is urged into sealing contact with the shoulder face 22.

In all of the foregoing embodiments the sealing device has been incorporated in a ball or roller bearing assembly. It is possible however to utilize features of the invention in a seal intended for general application. Thus in Figure 9 I have shown a sealing device which is intended for sealing between the shaft 56 and the outer housing 57. This sealing device consists of inner and outer structures, the inner structure consisting of a metal ring 58, having a press fit upon the shaft 56. The ring is provided with side annular surfaces 59, formed on a bevel like the surface 22 of Figure 1. The outer structure of the seal includes the annular mounting ring 61, which has a press fit within the bore of the housing 57. This ring serves to mount the two spring metal annuluses 62, which have their outer margins held apart by the spacer ring 63. The inner margins of the spring metal annuluses 62 overlap and form sealing engagements with the annular surfaces 59. As in the other embodiments the annuluses are stressed laterally within their elastic limits thereby developing sealing pressure between their inner margins and the surfaces 59. The force developed between the contacting surfaces is maximum at the regions 64, corresponding to the inner pheriperal edges of the annuluses 62, and is graduated as in the other embodiments. Substantially the same contact wear pattern is obtained as previously described with reference to Figure 3.

In manufacturing and assembling the seal shown in Figure 9, I may introduce a certain amount of lubricant into the space between the annuluses. This lubricant can be suitable viscous grease.

Figure 10 illustrates an embodiment similar to Figure 9. However in this instance the inner ring is formed of two parts 58a and 58a. Part 58a can be of ordinary low carbon steel, and part 58b of suitable material such as polished graphite, antifriction composition, or special metal or metal alloy.

Figure 11 illustrates another embodiment which is intended for general application to shafts. In this case the outer structure includes the mounting ring 66, together with the spring metal annuluses 67. The inner structure includes the mounting ring 68, together with the spring metal annuluses 69. The outer margins of annuluses 67 are held apart by the spacer ring 71, and annuluses 69 are similarly held apart by a spacer ring 72. The annuluses 69 are so formed that their outer margins provide exterior surfaces 75 corresponding generally to the annular surfaces 59 of Figure 9. In other words surfaces 75 are nonplanar, and conform generally to conical surfaces. The annuluses 67 are stressed laterally within their elastic limits, whereby their inner margins are pressed into sealing engagement with the outer surfaces 75 of annuluses 69. The general shaping of the annuluses 69 as illustrated in Figure 11 can be obtained by dishing the same prior to assembly. Here again the arrangement is such as to provide the contact pattern illustrated in Figure 3, with the maximum loading pressure between the contacting surfaces being applied in the regions 74.

In Figure 12 a seal structure like Figure 9 has been applied to a ball bearing assembly. Thus the outer race 81 is recessed to receive the spring metal annuluses 82, the spacer ring 83, and the retaining ring 84. The inner race 85 is recessed to mount the rigid rotor 86 which has beveled surfaces corresponding to the surfaces 59 of Figure 9. The inner edges of the annuluses press upon the surfaces of rotor 86 in the same manner as described for Figure 9.

In Figure 13 the construction uses parts as in Figure 1, but an additional annular member 88 is mounted in the inner race and has its outer margin in contact with an annular intermediate region of the annuluses 16. Thus some contact pressure between parts 16 and 88 aids in retaining the inner margin of the annulus in sealing engagement with shoulder 22, and sealing engagement is less affected by fluid pressure applied to the right hand side of the same. Member 88 also protects the sealing surfaces against external dust.

That form of the invention illustrated in Figure 14 is similar to Figure 13, but a member 91 of resilient material is inserted between members 88 and the annulus 16. Member 91 can be a simple annulus formed of suitable resilient material, such as resilient synthetic rubber. Members 91 and 88 form a secondary seal on the exterior of the annulus 16, and also serve to urge the annulus against the shoulder 22.

The seal construction illustrated in Figure 15 is likewise similar to Figure 13, but in this instance a member 92 formed of resilient material has been employed in place of the member 88. Member 92 can be formed L-shaped as illustrated in Figure 16. Thus it consists of a body of resilient material having a radially extending portion 92a and an axially extending portion 92b. The one side face 93 can be formed at a small angle $c$ to a plane at right angles to the axis of the assembly. In a typical instance this angle may be of the order of from 3 to 8°. The inner peripheral face 94 is preferably conical, rather than cylindrical. Thus the angle $d$ formed between the surface 94 and the surface of a cylinder, can be of the order of from 2 to 5°.

The body of the device 92 is preferably reinforced by a spring metal member 96. This member can be L-shaped with two portions 96a and 96b corresponding to the body portions 92a and 92b. Either portion 96a or portion 96b, or both, can be slotted to form spring fingers. The member 96 can be formed of suitable thin spring metal, as for example spring steel having a thickness ranging from 0.003 to 0.005 inch. The smallest diameter of the inner periphery 94 is made slightly less than the diameter of surface 21 whereby the member 92 is slightly expanded when it is pressed upon the cylindrical surface 21.

Figure 17 shows another seal assembly which makes use of the resilient member 92. In this instance the spring metal annulus 97 engages a shoulder face 98 substantially the same as in Figure 13. The outer race 99 carries a second metal annulus 101, which is held upon the outer race by the retaining ring 102, and which is retained in spaced relationship with the annulus 97 by spacer ring 103. Annulus 101 may be relatively rigid or made of spring metal like 97. The device 92 is fitted upon the cylindrical surface 104 of the inner race 106, and has its face 93 pressed into contact with the inner margin of the annulus 101. Here again the member 92 forms a secondary seal for the assembly which supplements the seal between the annulus 97 and face 98, and serves to protect the latter against dust.

Figure 18 shows a modification of the assembly shown in Figure 17, in which the metal annulus 101 is provided with an annular struck-out ridge 107. This ridge is proportioned to apply some pressure to the annulus 97, thus deflecting it laterally to urge the inner margin of the same into sealing engagement with the face 98.

It will be evident from the foregoing that I have provided a lubricant sealing device which can assume a number of embodiments, and which can be modified in various ways as will be understood by those skilled in the art. As previously explained my device is particularly well adapted for use with ball or roller bearing assemblies, where the assembly is packed with lubricant at the factory and where it is desired to employ the assembly for an indefinite period of time without servicing. My seal will provide a long useful life greater or comparable to the useful life of conventional ball or roller bearing assemblies. In addition my seal is not detrimentally affected by abrasive dust particles which may be present in the surrounding atmosphere. The torque provided is relatively low and thus there is minimum tendency toward overheating at higher speeds of operation. Because of the absence of parts made of rubber, leather or like material, the seal is able to operate at relatively high or low temperatures. Considerable external fluid pressure can be applied without disrupting the seal and therefore it is applicable for various service conditions where it might be subjected to liquid or gaseous pressures.

Reference is made to my copending applications Serial Nos. 105,760, filed July 20, 1949; 130,956, filed December 3, 1949; 130,955, filed December 3, 1949; and 105,478, filed July 19, 1949, now abandoned.

I claim:

1. In combination with inner and outer relatively rotatable members, a thin resilient metal annulus having one peripheral edge sealed and fixed with respect to a first one of said members, means defining an axially facing annular surface on the other of said members, one side face of the free peripheral margin of the annulus being in radially overlapping relation to said annular surface, said annulus normally tending to assume a position wherein the said one side face defines a surface radially converging toward said annular surface, in a direction away from said first one of said members, said annulus and annular surface being so axially positioned that the free edge of said annulus is axially deflected, by said annular surface, within the elastic limit thereof to bring a marginal portion of said one side face into surface contact with said annular surface whereby the greatest pressure between said surfaces is at said free edge, the radial extent of said surface contact being substantially less than the total radial overlap of said surfaces.

2. A device as defined in claim 1 wherein said members comprise inner and outer races of a bearing assembly and wherein said annular surface is a conical surface defined by a rigid shoulder on said inner race.

3. A device as defined in claim 1 wherein said one side face has a thin flexible coating of thermally set synthetic resin bonded thereto.

4. A device as defined in claim 1 wherein said first one of said members carries a pair of annuluses and wherein said other member carries a pair of oppositely directed annular surfaces cooperating respectively with the annuluses of said pair in the manner set forth.

5. A device as defined in claim 1 wherein said members comprise inner and outer races of a bearing assembly and including an annular member of resilient material disposed on the inner race and having a face disposed in sealing contact with an inner margin of said annulus.

6. A device as defined in claim 5 wherein said last-named annular member is L-shaped in section and is reinforced by an annulus of thin spring metal.

LAWRENCE G. SAYWELL.

REFERENCES CITED

The following references are of record in the file of this patent:

UNITED STATES PATENTS

| Number | Name | Date |
|---|---|---|
| 1,891,706 | De Ram | Dec. 20, 1932 |
| 2,428,041 | Saywell | Sept. 30, 1947 |

FOREIGN PATENTS

| Number | Country | Date |
|---|---|---|
| 11,787 | Great Britain | of 1908 |